US012805995B2

(12) United States Patent
Koreeda

(10) Patent No.: US 12,805,995 B2
(45) Date of Patent: Nov. 24, 2026

(54) WHEELCHAIR FOR FOUR-LEGGED ANIMAL

(71) Applicant: Hiroaki Koreeda, Shimabara (JP)

(72) Inventor: Hiroaki Koreeda, Shimabara (JP)

( * ) Notice: Subject to any disclaimer, the term of this patent is extended or adjusted under 35 U.S.C. 154(b) by 0 days.

(21) Appl. No.: 19/484,088

(22) PCT Filed: Feb. 14, 2025

(86) PCT No.: PCT/JP2025/004874
§ 371 (c)(1),
(2) Date: Nov. 13, 2025

(87) PCT Pub. No.: WO2025/177953
PCT Pub. Date: Aug. 28, 2025

(65) Prior Publication Data

US 2026/0114975 A1 Apr. 30, 2026

(30) Foreign Application Priority Data

Feb. 20, 2024 (JP) ................................. 2024-037629
Apr. 23, 2024 (JP) ................................. 2024-079769
May 2, 2024 (JP) ................................. 2024-083677

(51) Int. Cl.
*A61D 99/00* (2006.01)
*A01K 15/02* (2006.01)

(52) U.S. Cl.
CPC .................................... *A61D 99/00* (2013.01)

(58) Field of Classification Search
CPC .......... A61D 99/00; A61D 9/00; A61H 3/008; A61H 2203/03; A01K 29/00; A01K 15/02; A01K 1/0613; A01K 27/002; A01K 15/04
See application file for complete search history.

(56) References Cited

U.S. PATENT DOCUMENTS 3,241,851 A * 3/1966 Dingbaum ............... A61D 9/00 280/43
4,375,203 A * 3/1983 Parkes ..................... A61D 9/00 119/727
2017/0232279 A1* 8/2017 Strohman .......... A62B 35/0056 182/36
2022/0125664 A1* 4/2022 Koreeda ................ A61H 3/008

FOREIGN PATENT DOCUMENTS

| | | | |
|---|---|---|---|
| CN | 215607418 U | 1/2022 | |
| JP | 2013-9849 A | 1/2013 | |
| JP | 7300787 B1 | 6/2023 | |
| WO | 2018/147022 A1 | 8/2018 | |
| WO | 2021/024967 A1 | 2/2021 | |
| WO | 2023/248269 A1 | 12/2023 | |
| WO | WO-2025019696 A2 * | 1/2025 | ............... A61H 3/04 |

* cited by examiner

*Primary Examiner* — Magdalena Topolski
*Assistant Examiner* — Spencer T Callaway
(74) *Attorney, Agent, or Firm* — Muncy, Geissler, Olds & Lowe, P.C.

(57) ABSTRACT

A wheelchair for a four-legged animal that comprises: an impaired limb side holder 3; a pair or more of left and right wheel arms 5 that are mounted to the impaired limb side holder 3 at its left and right positions, and rotatably support wheels 6; and a wheel hoisting and lowering mechanism 7 that independently changes relative height of each wheel 6 relative to the impaired limb side holder 3 in order to reduce tilt of the attached impaired limb side holder 3 when it tilts due to changes of conditions in road surface or body.

8 Claims, 11 Drawing Sheets

[Fig.1]
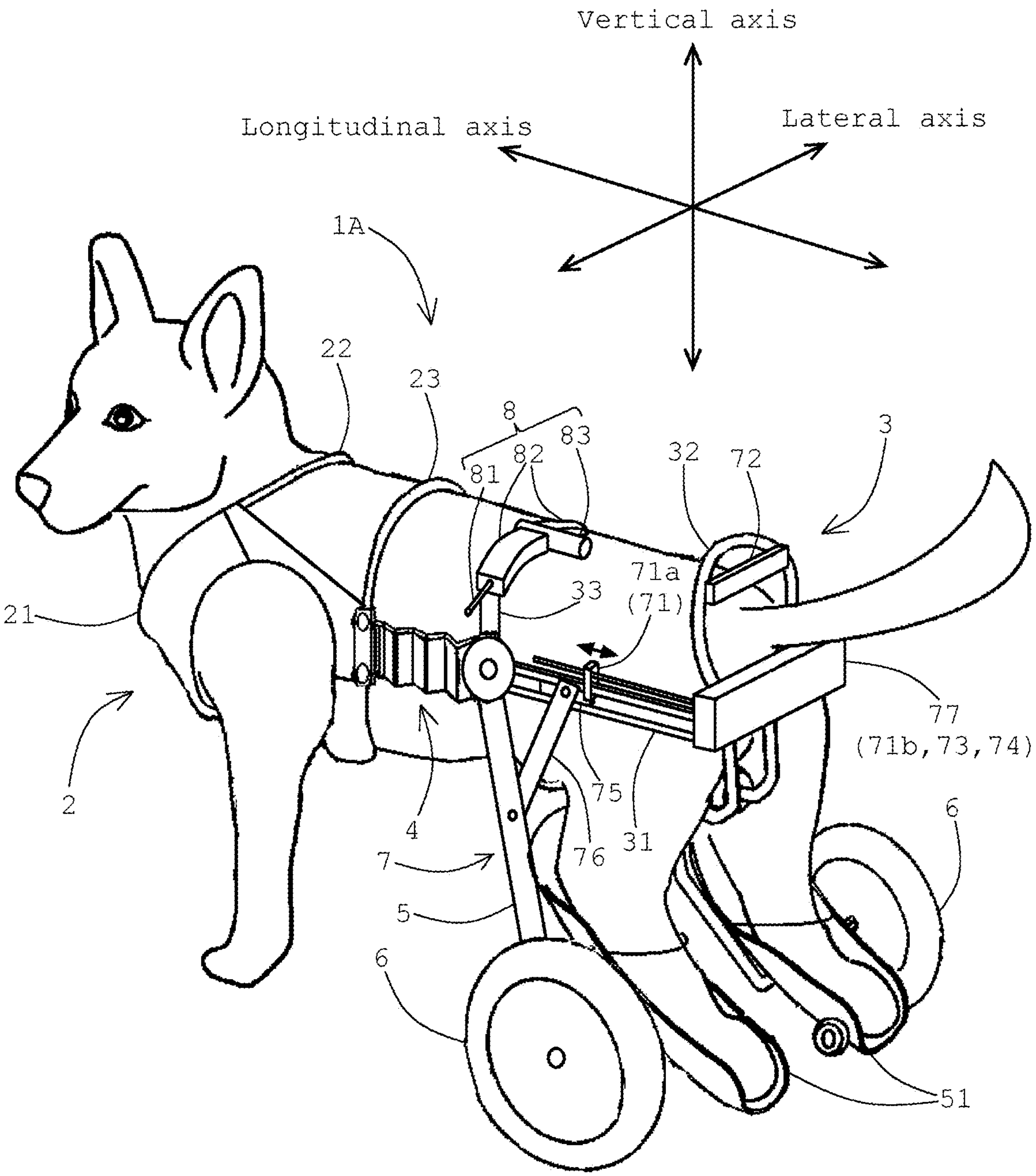

[Fig.2]
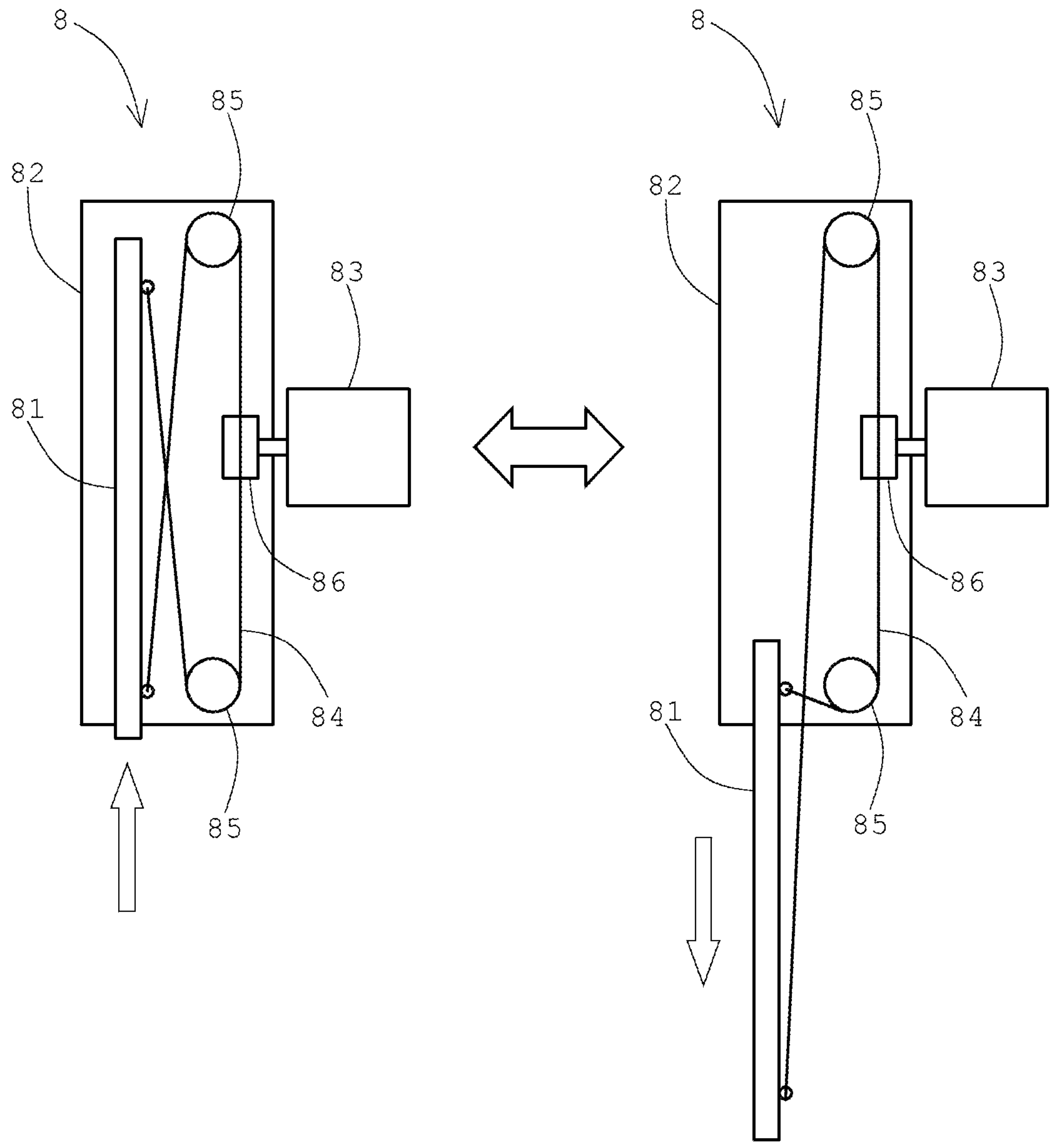

[Fig.3]
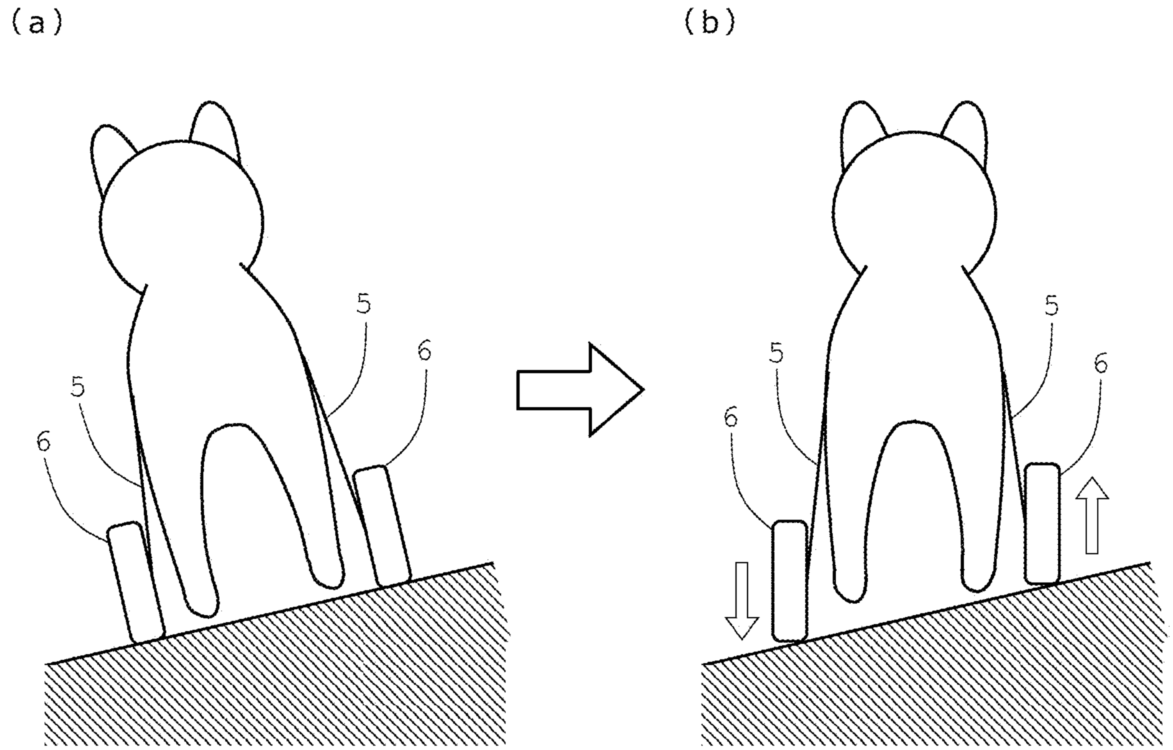

[Fig.4]
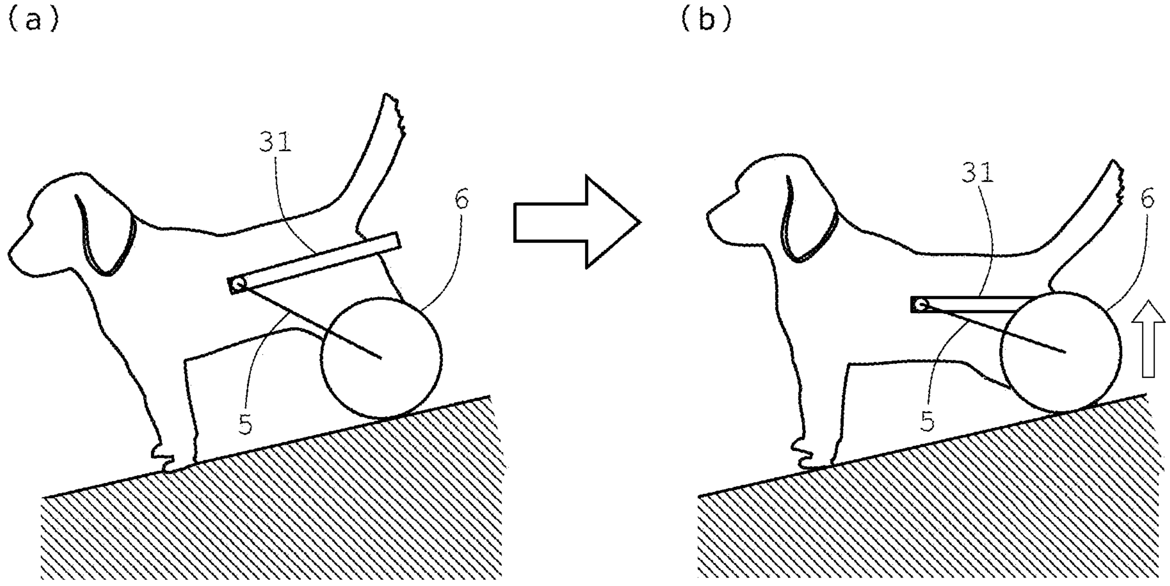

[Fig.5]
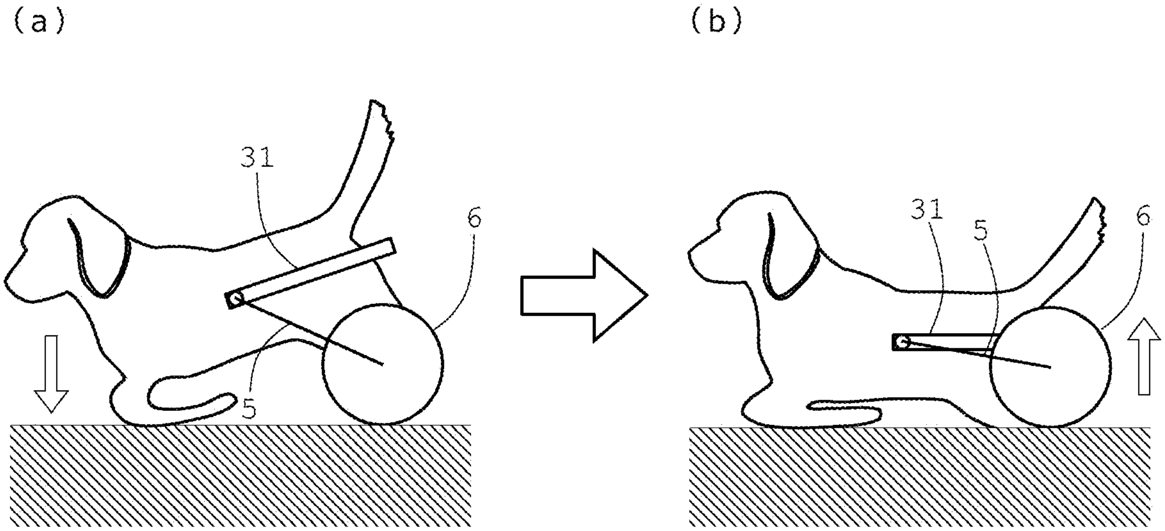

[Fig.6]
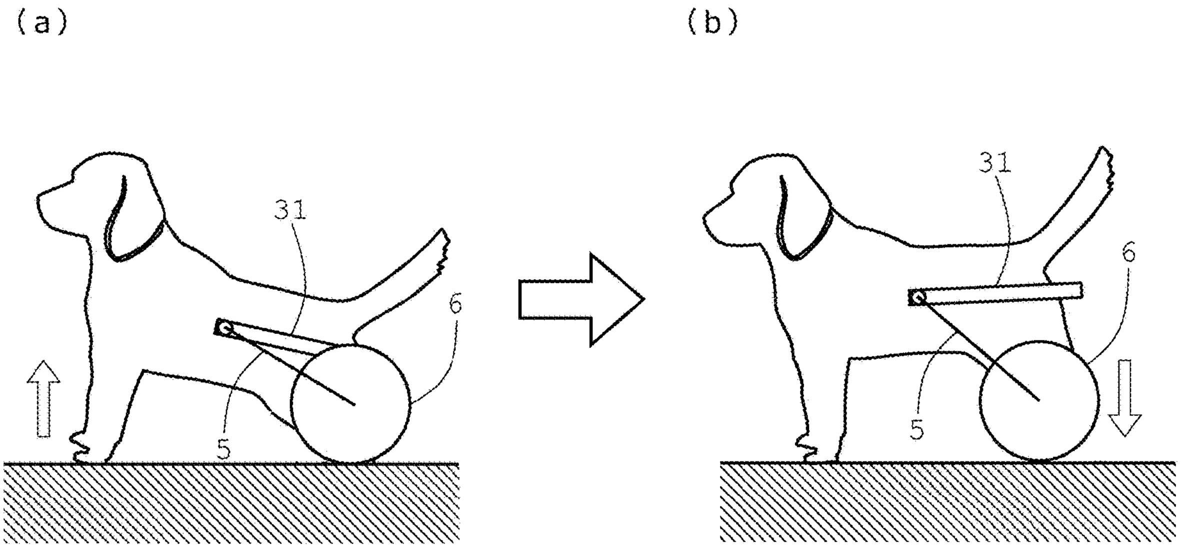

[Fig.7]
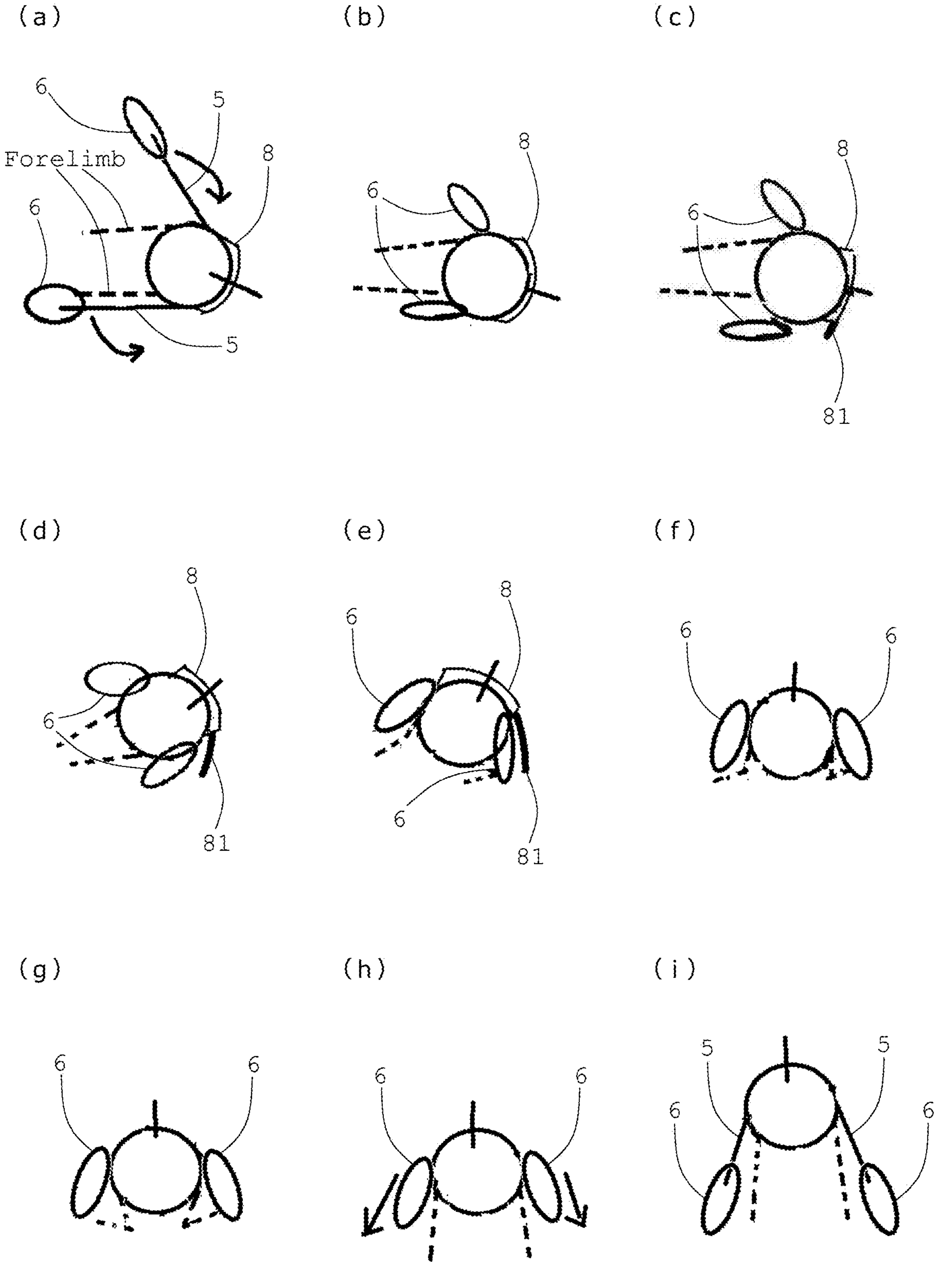

[Fig.8]
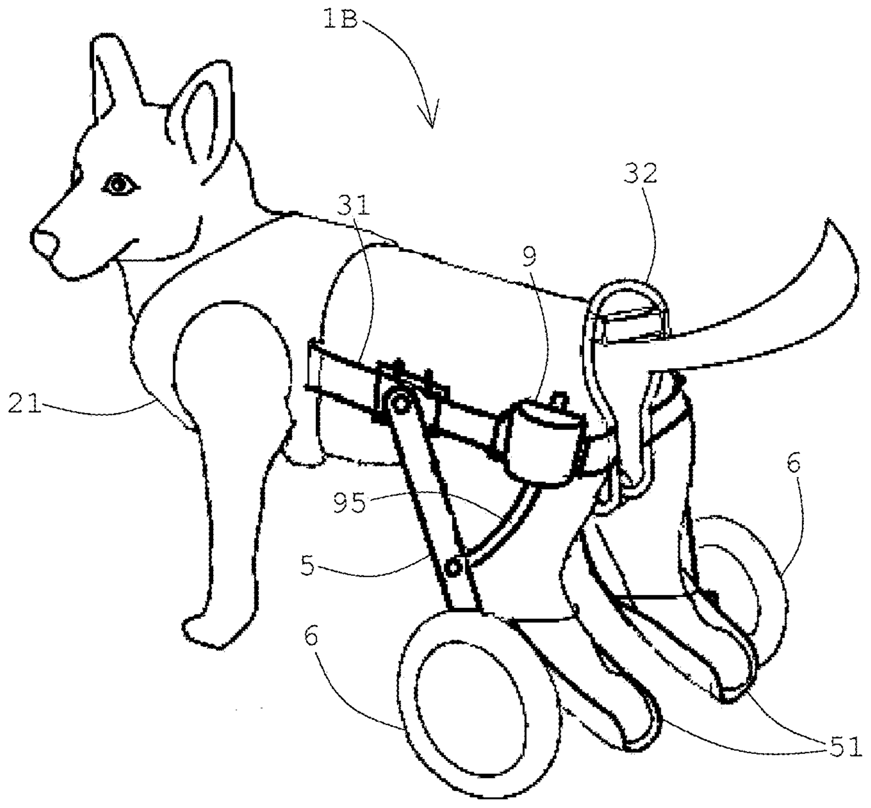

[Fig.9]
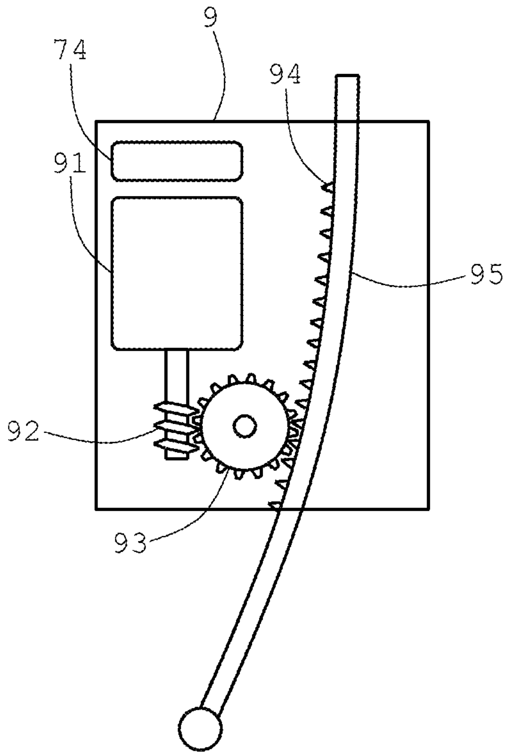

[Fig.10]
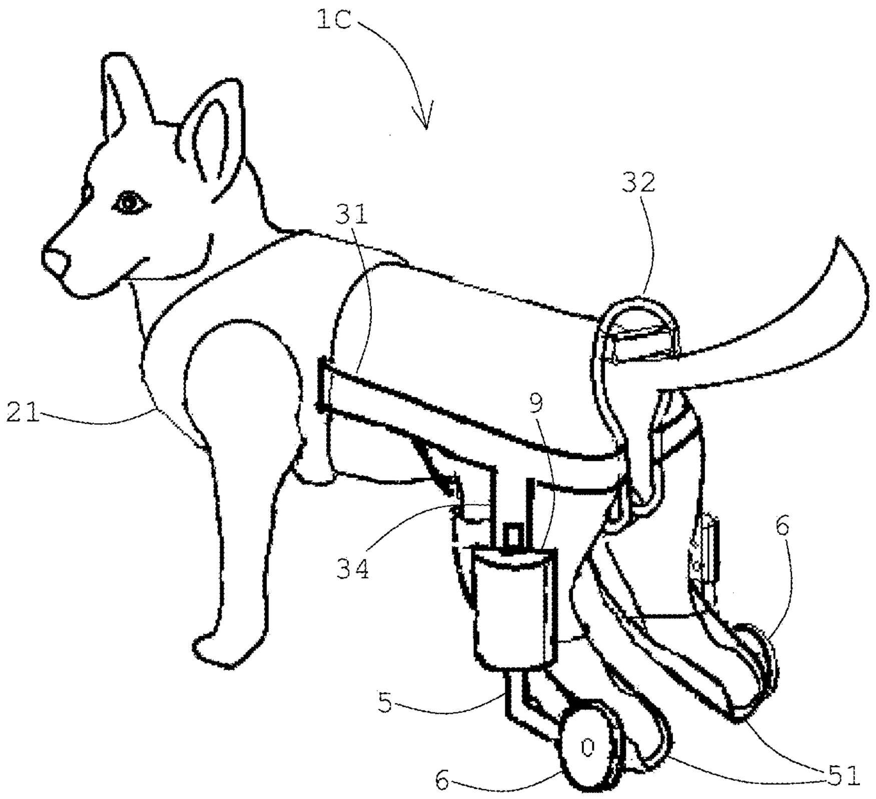

[Fig. 11]
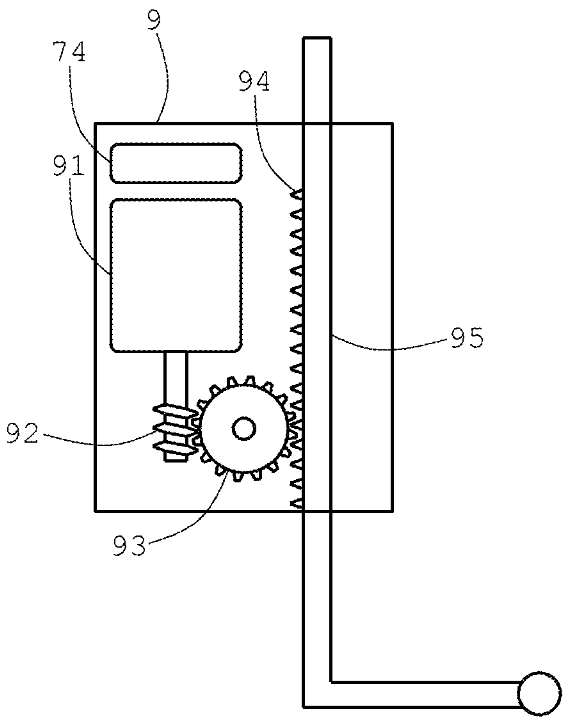

WHEELCHAIR FOR FOUR-LEGGED ANIMAL

TECHNICAL FIELD

The present invention relates to a wheelchair for four-legged animal used for four-legged animals that have difficulty walking due to illness, accidents, etc.

BACKGROUND ART

Conventionally, wheelchairs for four-legged animal for four-legged animals that have difficulty walking due to illness, accidents, etc., have been proposed. For example, Japanese Patent Publication No. 7300787 discloses a wheelchair for four-legged animal that allows transition to a seated position by moving a main frame downward when wheels stop, and transition to a standing position by moving the main frame upward when wheels rotate (Patent Document 1).

CITATION LIST

Patent Literature

Patent Document 1: Japanese Patent Publication No. 7300787

SUMMARY OF INVENTION

Technical Problem

However, conventional wheelchairs for four-legged animal, including the one described in Patent Document 1, have left and right wheels that are always at the same height. Consequently, when tilting laterally due to ground irregularities during walking, they are prone to losing balance and tipping over. While some designs widen the wheel distance to reduce tipping, this increases the likelihood of colliding with surrounding obstacles, causing significant mental stress to a four-legged animal.

Furthermore, according to the wheelchair for four-legged animal described in the above Patent Document 1, the main frame constantly moves upward during walking. Consequently, when tilting forward (leaning forward) on decline or similar terrain, it causes fear in the four-legged animal and poses a high risk of actually falling down. On the other hand, when the wheelchair for four-legged animal stops, the main frame always moves downward. Consequently, even if the four-legged animal does not intend to rest, it is forcibly transitioned into a seated position. This interferes with movement based on free will and causes mental stress.

The present invention has been devised to solve the problem. An object of the present invention is to provide a wheelchair for four-legged animal that reduces tilt of an impaired limb side holder caused by changes of conditions in road surface or body, thereby reducing the risk of falling, also provides a sense of security, high safety, and enables stress-free walking based on free will.

Solution to Problem

A wheelchair for four-legged animal according to the present invention, in order to solve the problem such that reduces tilt of an impaired limb side holder caused by changes of conditions in road surface or body, thereby reducing the risk of falling, also provides a sense of security, high safety, and enables stress-free walking based on free will, the wheelchair for four-legged animal used for a four-legged animal comprise an impaired limb side holder that is attached to an impaired limb side body of the four-legged animal, a pair or more of left and right wheel arms that are mounted to the impaired limb side holder at its left and right positions and rotatably support wheels, and a wheel hoisting and lowering mechanism that independently changes relative height of each wheel relative to the impaired limb side holder in order to reduce tilt of the attached impaired limb side holder when it tilts due to changes of conditions in road surface or body.

Also, as an aspect of the present invention, in order to solve the problem of reliably reducing the tilt of the impaired limb side holder by acquiring command signals from the control unit or external smartphones and remote controllers, the wheel hoisting and lowering mechanism may comprise an actuator provided for each wheel arm, which drives the wheel arms according to a specified drive direction and drive amount, and a command signal acquisition unit which acquires a command signal, which contains the drive direction and the drive amount for each actuator, for reducing the tilt of the impaired limb side holder by moving each wheel arm up or down.

Furthermore, as an aspect of the present invention, in order to solve the problem of accurately and automatically calculating the drive direction and the drive amount for each actuator that can reduce the tilt of the impaired limb side holder, the wheelchair for four-legged animal may further comprise a tilt sensor for detecting the tilt of the impaired limb side holder, and a control unit that calculates the drive direction and the drive amount of each actuator based on a detection signal output from the tilt sensor, and outputs a command signal to the command signal acquisition unit.

Also, as an aspect of the present invention, in order to solve the problem of automatically and independently returning the four-legged animal that has fallen and assumes a side lying state to a standing state, the wheelchair for four-legged animal may further comprise a fall recovery mechanism, which has a pair of assist bars extendable in both rightward and leftward directions relative to the impaired limb side holder, extends the assist bar that has become road-side to contact the road surface, thereby using the reaction force to return the four-legged animal to a standing state when the four-legged animal falls and assumes a side lying state.

Furthermore, as an aspect of the present invention, in order to solve the problem of facilitating the return to a standing position for the four-legged animal that has fallen and assumes a side lying state, the control unit may drive the actuator to move each wheel arm upward before the fall recovery mechanism extends the assist bar.

Advantageous Effect of Invention

The present invention enables to reduce tilt of an impaired limb side holder caused by changes of conditions in road surface or body, thereby reducing the risk of falling, also provides a sense of security, high safety, and enables stress-free walking based on free will.

BRIEF DESCRIPTION OF DRAWINGS

FIG. 1 illustrates a four-legged animal that wears the first embodiment of a wheelchair for four-legged animal according to the present invention.

FIG. 2 illustrates movements of the fall recovery mechanism in the first embodiment.

FIG. 3(*a*) illustrates the state before the tilt is reduced in the case walking on a road surface inclined in the left and right direction, and FIG. 3(*b*) illustrates the state after the tilt has been reduced in the case walking on a road surface inclined in the left and right direction.

FIG. 4(*a*) illustrates the state before the tilt is reduced in the case walking on a road surface inclined in the front and back direction, and FIG. 4(*b*) illustrates the state after the tilt has been reduced in the case walking on a road surface inclined in the front and back direction.

FIG. 5(*a*) illustrates the state before the tilt is reduced in the case of taking a break on your own initiative, and FIG. 5(*b*) illustrates the state after the tilt has been reduced in the case of taking a break on your own initiative.

FIG. 6(*a*) illustrates the state before the tilt is reduced in the case of standing up on your own initiative, and FIG. 6(*b*) illustrates the state after the tilt has been reduced in the case of standing up on your own initiative.

FIG. 7 illustrates the process by which a four-legged animal returns from a fallen state to a standing state using the fall recovery mechanism of the first embodiment.

FIG. 8 illustrates a four-legged animal that wears the second embodiment of a wheelchair for four-legged animal according to the present invention.

FIG. 9 illustrates the interior of the gearbox in the second embodiment.

FIG. 10 illustrates a four-legged animal that wears the third embodiment of a wheelchair for four-legged animal according to the present invention.

FIG. 11 illustrates the interior of the gearbox in the third embodiment.

DESCRIPTION OF EMBODIMENTS

The embodiments of a wheelchair for four-legged animal according to the present invention will be described below in accordance with the accompanying drawings.

A wheelchair for four-legged animal 1A of the first embodiment is used for a four-legged animal whose hindlimbs are impaired limb as illustrated in FIG. 1. In the first embodiment, the four-legged animal is a dog but is not limited thereto. The present invention is applicable to all animals walking with four legs. In the following description, indicated directions are shown by using the longitudinal direction, the lateral direction, and the vertical direction of a four-legged animal.

As illustrated in FIG. 1, the wheelchair for four-legged animal 1A of the first embodiment mainly includes a healthy limb side holder 2 attached to a healthy limb side body of the four-legged animal, an impaired limb side holder 3 that is attached to an impaired limb side body of the four-legged animal, a pair of connecting members 4 that connect the healthy limb side holder 2 and the impaired limb side holder 3, a pair of wheel arms 5 that are mounted to the impaired limb side holder 3 at its left and right positions, a wheel hoisting and lowering mechanism 7 that independently changes relative height of each wheel 6 relative to the impaired limb side holder 3, and a fall recovery mechanism 8 that returns the fallen four-legged animal to a standing state. The configurations will be described below.

The healthy limb side holder 2 is attached to the healthy limb side body of the four-legged animal. In the first embodiment, as illustrated in FIG. 1, the healthy limb side holder 2 includes a wearing portion 21 comprising mesh fabric, etc., that envelops the healthy limb side body of the four-legged animal, an arch-shaped neck frame 22 that is provided above the wearing portion 21 and is arranged around the neck of the four-legged animal, and an arch-shaped back frame 23 that is provided above the wearing portion 21 and is arranged around the back of the four-legged animal.

The impaired limb side holder 3 is attached to the impaired limb side body of the four-legged animal. In the first embodiment, as illustrated in FIG. 1, the impaired limb side holder 3 includes a pair of horizontal frames 31, 31 provided substantially horizontally along both sides of the body of the four-legged animal, a saddle frame 32 connected to the front ends of each horizontal frame 31, supporting the abdomen of the four-legged animal and arranged around the tail, and a waist frame 33 connecting the front ends of the saddle frames 32 so that they span across the waist area.

The connecting member 4 connects the healthy limb side holder 2 and the impaired limb side holder 3. In this first embodiment, as illustrated in FIG. 1, the connecting members 4 are provided in a pair to connect the healthy limb side holder 2 and the impaired limb side holder 3 at both left and right positions. Also, each connecting member 4 is configured to be independently extendable and retractable in the longitudinal direction in order to make the four-legged animal freely bend its body in the lateral direction. Specifically, each connecting member 4 has a hinge structure in which two or more plates are connected in a zigzag pattern by hinge pins, with the hinge pins being arranged to extend substantially vertically.

The wheel arm 5 rotatably supports wheel 6. In this first embodiment, as illustrated in FIG. 1, the wheel arm 5 is provided as a left-right pair at the left and right positions of the impaired limb side holder 3. Also, the upper end of each wheel arm 5 is swingy mounted at the connected portion between the connecting member 4 and the impaired limb side holder 3, while the lower end of each wheel arm 5 rotatably supports the wheel 6.

Also, in this first embodiment, as illustrated in FIG. 1, the upper end of the impaired limb cover 51, which is formed into a semicylindrical shape using plastic or similar material and holds the impaired limb in an enveloping manner, is fixed to the lower portion of the saddle frame 32. This allows each impaired limb cover 51 to freely move up and down while suspended from the saddle frame 32. Furthermore, each impaired limb cover 51 may be fixed at any position as long as it can freely move up and down. For example, the impaired limb cover 51 may be fixed to the rotational shaft of each wheel 6, allowing it to move up and down independently with the lifting and lowering action of each wheel 6.

The wheel hoisting and lowering mechanism 7 independently changes the relative height of each wheel 6 relative to the impaired limb side holder 3. In this first embodiment, as shown in FIG. 1, the wheel hoisting and lowering mechanism 7 is provided for each wheel arm 5 and comprises an actuator 71 that drives each wheel arm 5, a tilt sensor 72 that detects the tilt of the impaired limb side holder 3, a control unit 73 that calculates the drive direction and the drive amount for each actuator 71 based on the detection signal output from the tilt sensor 72, and a command signal acquisition unit 74 that acquires the command signals containing the drive direction and the drive amount for each actuator 71.

In this first embodiment, the actuator 71 comprises a linear actuator consisting of feed screw 71*a* and stepping motor 71*b*, driving the wheel arm 5 according to a specified driving direction and driving amount. Specifically, as shown in FIG. 1, actuator 71 includes a slider 75 fixed to feed screw 71*a* and capable of sliding along horizontal frame 31, and a connecting frame 76 that connects the slider 75 with the wheel arm 5.

This configuration causes the stepping motor 71*b* to drive the slider 75, which is fixed to the feed screw 71*a*, forward by a predetermined amount. Consequently, the connecting frame 76 swings the wheel arm 5 downward by the same amount, thereby moving the relative height of the wheel 6 relative to the impaired limb side holder 3 to a lower position. Conversely, when the stepping motor 71*b* drives the slider 75, which is fixed to the feed screw 71*a*, backward by a predetermined amount, the connecting frame 76 swings the wheel arm 5 upward by the same amount. Consequently, the relative height of the wheel 6 relative to the impaired limb side holder 3 moves to a higher position.

The stepping motor 71*b* is housed within the actuator box 77 along with the control unit 73, the command signal acquisition unit 74, and the power supply etc. Also, the tilt sensor 72 is fixed to the saddle frame 32. When the impaired limb side holder 3, mounted by the four-legged animal, tilts in the longitudinal direction (tilt about the lateral axis) or the lateral direction (tilt about the longitudinal axis) due to changes of conditions in road surface or body, the tilt sensor 72 outputs a detection signal indicating that tilt. Furthermore, the tilt sensor 72 can detect based on the detected tilt that the four-legged animal has fallen and has assumed a side lying state. It is also preferable that the mounting position of the tilt sensor 72 be on the centerline of the four-legged animal's body, at a location that does not interfere with movement.

The control unit 73 is configured as a functional unit executed by the CPU (Central Processing Unit) and calculates the drive direction and the drive amount for each actuator 71 that can reduce the tilt of the impaired limb side holder 3 based on the detection signal output from the tilt sensor 72. The control unit 73 then outputs a command signal containing the drive direction and the drive amount for each actuator 71 to the command signal acquisition unit 74.

The command signal acquisition unit 74 is configured as a functional unit executed by the CPU and acquires the command signal output from the control unit 73 and commands the actuator 71 with the drive direction and the drive amount contained within the command signal. In other words, the command signal contains the drive direction and the drive amount for each actuator 71 and is a signal to reduce the tilt of the impaired limb side holder 3 by moving each wheel arm 5 up and down via the actuator 71.

In this first embodiment, the control unit 73 and the command signal acquisition unit 74 are configured by the CPU, and the command signal acquisition unit 74 acquires command signals generated by the control unit 73. However, this configuration is not limited to this. For example, the command signal acquisition unit 74 may be configured by a wireless receiver to acquire command signals from external devices such as smartphones or remote controllers.

In the case of smartphone, it analyzes the posture in real time through image processing while imaging four-legged animal in walking. If tilt occurs, it generates a command signal to reduce the tilt and transmitted to the command signal acquisition unit 74. Also, in the case of remote controller, it is provided with operation buttons (such as up/down buttons) corresponding to each wheel 6. The remote controller is configured such that, only while the operation button is pressed, it transmits a command signal driving actuator 71 in the direction corresponding to the operation button.

According to the remote controller described above, when an owner or other operator operates the operation buttons while watching the four-legged animal in walking, a command signal to reduce the tilt of the four-legged animal is transmitted to the command signal acquisition unit 74. Furthermore, an owner familiar with the four-legged animal's specific signs and habits can output appropriate command signals at the right timing. For example, when the four-legged animal appears ready to sit (with its hindquarters touching the ground), the owner can lift the wheel arm 5 to encourage a rest.

The fall recovery mechanism 8 returns a fallen four-legged animal to a standing state. In this first embodiment, as shown in FIG. 1, the fall recovery mechanism 8 comprises a pair of assist bars 81, 81 extendable in both rightward and leftward directions relative to the impaired limb side holder 3, an assist box 82 for housing these assist bars 81, and a drive motor 83 for extending and retracting each assist bar 81. This drive motor 83 is controlled by the control unit 73.

Specifically, as shown in FIG. 2, both ends of wire 84 are fixed to the tip and base ends of assist bar 81, respectively. This wire 84 is wound around winding shaft 85, provided at both ends within assist box 82, and around the rotation shaft 86 of drive motor 83. Thus, when the drive motor 83 is rotated clockwise or counterclockwise, the wire 84 is pulled in either direction, causing the assist bar 81 to extend or retract relative to the assist box 82.

Then, when the tilt sensor 72 detects that the four-legged animal has fallen and assumes a side lying state, the control unit 73 first drives the actuator 71 to move each wheel arm 5 upward. Subsequently, the control unit 73 drives the drive motor 83 to extend the assist bar 81 that has become road-side to contact the road surface, thereby using the reaction force to return the four-legged animal to a standing state. Furthermore, after extending the assist bar 81, the control unit 73 drives the actuator 71 to move each wheel arm 5 downward.

Next, the operations of the wheelchair for four-legged animal 1A of the first embodiment will be described below using figures. Note that FIGS. 3 to 7 illustrate a simplified representation of the wheelchair for four-legged animal 1A.

As shown in FIG. 3(*a*), when a four-legged animal equipped with the wheelchair for four-legged animal 1A of the first embodiment is walking and encounters a change in road surface conditions where the road surface is tilted laterally relative to the longitudinal axis, the tilt sensor 72 detects this tilt and outputs the detection signal to the control unit 73. Upon receiving the detection signal from the tilt sensor 72, the control unit 73 calculates the drive direction and the drive amount for each actuator 71 to reduce the tilt of the impaired limb side holder 3, i.e., so as to lower the left wheel 6 and raise the right wheel 6, and then outputs a command signal containing these values to the command signal acquisition unit 74.

When the command signal acquisition unit 74 acquires the command signal from the control unit 73, it commands the drive direction and the drive amount contained in the command signal to the actuator 71. This causes the actuator 71 to move each wheel arm 5 up and down according to the drive direction and the drive amount specified by the command signal and thereby, as shown in FIG. 3(*b*), the tilt of the impaired limb side holder 3 is reduced. Consequently, the four-legged animal can walk stably without losing balance and is less prone to fall sideways. Furthermore, since there is no need to widen the spacing between the wheels 6, collisions with surrounding obstacles are less likely, reducing the mental stress imposed on the four-legged animal.

Also, as shown in FIG. 4(*a*), when a four-legged animal equipped with the wheelchair for four-legged animal 1A of the first embodiment is walking and encounters a change in road surface conditions where the road surface is tilted longitudinally relative to the lateral axis, the tilt sensor 72 detects this tilt and outputs the detection signal to the control unit 73. Consequently, the control unit 73 calculates the drive direction and the drive amount for each actuator 71 to reduce the tilt of the impaired limb side holder 3, i.e., so as to raise both wheels 6, and then outputs a command signal containing these values to the command signal acquisition unit 74.

This causes the actuator 71 to lift each wheel arm 5, as shown in FIG. 4(*b*), thereby reducing the tilt of the impaired limb side holder 3. Consequently, the four-legged animal experience a sense of security as the fear of tumbling is alleviated due to the reduced forward lean on downhill slopes, while also enhancing their safety. Conversely, on uphill slopes, the backward lean is reduced. Thereby the weight of the body is not placed too heavily on the impaired limb side but is also placed on the healthy limb (forelimb) side. This makes it easier for four-legged animal to transfer the force of the claws and soles of their healthy limbs to the road surface, making it easier for them to walk uphill.

Also, as shown in FIG. 5(*a*), when a four-legged animal takes a rest of its own will, it attempts to adopt a forward-leaning posture by folding its healthy limbs (forelimbs). This causes the body to shift into a forward-leaning posture, the tilt sensor 72 detects this tilt and outputs the detection signal to the control unit 73. Consequently, the control unit 73 calculates the drive direction and the drive amount for each actuator 71 to reduce the tilt of the impaired limb side holder 3, i.e., so as to raise both wheels 6, and then outputs a command signal containing these values to the command signal acquisition unit 74. Therefore, as shown in FIG. 5(*b*), the actuator 71 lifts each wheel arm 5 in accordance with the resting movements of the four-legged animal, enabling it to assume a resting posture under its own power without assistance from the owner or others.

On the other hand, as shown in FIG. 6(*a*), when four-legged animal stands up of its own will, it extends its healthy limbs (forelimbs).

This causes the body to shift into a backward-leaning posture, the tilt sensor 72 detects this tilt and outputs the detection signal to the control unit 73. Consequently, the control unit 73 calculates the drive direction and the drive amount for each actuator 71 to reduce the tilt of the impaired limb side holder 3, i.e., so as to lower both wheels 6, and then outputs a command signal containing these values to the command signal acquisition unit 74. Therefore, as shown in FIG. 6(*b*), the actuator 71 lowers each wheel arm 5 in accordance with the standing-up motion of the four-legged animal, enabling it to stand up under its own power without assistance from the owner or others.

Next, the operation of the fall recovery mechanism 8 will be explained. When the four-legged animal wearing the wheelchair for four-legged animal 1A of this first embodiment falls and assumes a side lying state, it flounders with its abdomen slightly facing upward, as shown in FIG. 7(*a*). At this point, the healthy limb (forelimb) on the road surface side, which would serve as the trigger for standing up, is positioned toward the abdomen, so the four-legged animal can only struggle in place. This is because for the four-legged animal to rise from the side lying state, its chest must face the road surface side.

Therefore, when the tilt sensor 72 detects that the four-legged animal has assumed the side lying state, the control unit 73 first drives the actuator 71 to lift each wheel arm 5 upward and move it to approximately waist height, as shown in FIG. 7(*b*). This allows the four-legged animal to easily rotate its body about the longitudinal axis.

Next, the control unit 73 drives the drive motor 83 to extend the assist bar 81 positioned on the road surface side. As a result, as shown in FIG. 7(*c*), the assist bar 81 contacts and presses against the road surface. Consequently, as shown in FIG. 7(*d*), the reaction force causes the body of the four-legged animal to rotate about the longitudinal axis, turning the previously slightly upward-facing abdomen sideways.

Furthermore, as the assist bar 81 extends, the posture of the wheelchair for four-legged animal 1A approaches the state prior to falling, as shown in FIG. 7(*e*). This allows the four-legged animal to move its healthy limb (left forelimb) on the road surface side relative to the body toward the fall side (right side in FIG. 7), as shown in FIG. 7(*f*). Consequently, as shown in FIG. 7(*g*), only the body (upper body) on the healthy limb side ends up in a prone position. Finally, as shown in FIG. 7(*g*), when the control unit 73 drives the actuator 71 to lower both wheel arms 5, the body (lower body) on the impaired limb side lifts up, as shown in FIG. 7(*i*). Consequently, the four-legged animal automatically and independently returns to a standing position.

In this first embodiment, as described above, to facilitate the four-legged animal's return to a standing state, each wheel arm 5 is moved upward before extending the assist bar 81, and then moved downward after extending the assist bar 81. However, this movement is not necessarily required if the four-legged animal can return solely using the assist bar 81. Furthermore, after the healthy limb side body (upper body) assumes a prone position (FIG. 7(*g*)), the four-legged animal may want to rest in the position, therefore the action of moving each wheel arm 5 downward is also not essential.

The first embodiment of the wheelchair for four-legged animal 1A according to the present invention as described above achieves the following effects:

1. The wheelchair for four-legged animal 1A can reduce the tilt of the impaired limb side holder 3 caused by changes of conditions in road surface or body, thereby reducing the risk of falling, also provides a sense of security, high safety, and enables stress-free walking based on free will.
2. The wheelchair for four-legged animal 1A can reliably reduce the tilt of the impaired limb side holder 3 by acquiring command signals from the control unit 73 or external equipment.
3. The wheelchair for four-legged animal 1A can accurately and automatically calculate the drive direction and the drive amount for each actuator 71 that can reduce the tilt of the impaired limb side holder 3.
4. The wheelchair for four-legged animal 1A can make automatically and independently return the four-legged animal that has fallen and assumes a side lying state to a standing state.
5. The wheelchair for four-legged animal 1A can facilitate the return to a standing position for the four-legged animal that has fallen and assumes a side lying state.
6. The four-legged animal can assume a resting position and rise from that position using only its own strength, without assistance from its owner or others.
7. Since there is no need to widen the left-right spacing of the wheels 6, the four-legged animal is less likely to collide with surrounding obstacles while walking, reducing mental stress.

8. By reducing the tilt of the impaired limb holder 3, the shaking of the wheelchair for four-legged animal 1A caused by road surface irregularities is reduced. This suppresses skin inflammation that occurs when the skin is wedged between the wheelchair for four-legged animal 1A and the bone.
9. The wheel hoisting and lowering mechanism 7 raises and lowers the wheels 6 in response to only inclinations caused by changes of conditions in road surface or body. Therefore, compared to prior art that raises and lowers wheels based on their state, the wheel hoisting and lowering mechanism 7 avoids performing unwanted hoisting and lowering actions that the four-legged animal would not desire.

Next, a second embodiment of the wheelchair for four-legged animal 1B according to the present invention will be described below. Among the configurations of the second embodiment, the configurations identical or equivalent to those of the first embodiment described above are indicated by the same reference numerals, and a redundant explanation thereof is omitted.

In the first embodiment described above, the wheel hoisting and lowering mechanism 7 swing the wheel arm 5 vertically by using the slider 75 and the connecting frame 76. However, the feature of this second embodiment lies in moving the wheel arm 5 vertically by using a worm gear.

Specifically, as illustrated in FIG. 8, a gearbox 9 is provided on each horizontal frames 31 on the left and right side. The gearbox 9 includes, as shown in FIG. 9, a wireless receiver serving as the command signal acquisition unit 74, a hoisting and lowering motor 91 for raising and lowering the wheel 6, a worm 92 mounted on the output shaft of the hoisting and lowering motor 91, a worm wheel 93 that rotates in meshing engagement with this worm 92, and an vertical movement bar 95 that moves vertically via a rack 94 meshing with the worm wheel 93.

The lower end of the vertical movement bar 95 is connected to the wheel arm 5. By swinging the wheel arm 5 vertically, the height position of the wheel 6 is raised or lowered. The vertical movement bar 95 is formed in an arc shape to follow the swinging trajectory of the wheel arm 5.

According to the wheelchair for four-legged animal 1B of the second embodiment as described above, it achieves the same effects as the first embodiment described above.

Next, the third embodiment of the wheelchair for four-legged animal 1C according to the present invention will be described. Among the configurations of the third embodiment, the configurations identical or equivalent to those of each embodiment described above are indicated by the same reference numerals, and a redundant explanation thereof is omitted.

In the second embodiment described above, the wheel hoisting and lowering mechanism 7 raised and lowered the wheel 6 by swinging the wheel arm 5 via the vertical movement bar 95. However, the feature of this third embodiment lies in directly attaching the wheel 6 to the vertical movement bar 95 for vertical movement.

Specifically, as shown in FIG. 10, the vertical frames 34 are suspended along the impaired limb from the horizontal frames 31 on the left and right side, and the gearbox 9 is mounted on these vertical frames 34. The interior of the gearbox 9 is configured similarly to the second embodiment, as shown in FIG. 11, and the vertical movement bar 95 is formed in a substantially L-shape. The wheel 6 is pivotally supported at the tip of the vertical movement bar 95.

According to the wheelchair for four-legged animal 1C of the third embodiment as described above, it achieves the same effects as each embodiment described above.

The wheelchair for four-legged animal 1A, 1B, 1C according to the present invention is not limited to the foregoing embodiments and can be properly changed.

For example, each of the above embodiments described the wheelchairs for four-legged animal 1A, 1B, and 1C for four-legged animal with impaired hind limbs. However, the configuration is not limited to these embodiments. Specifically, the front-to-back relationship between the healthy limb side holder 2 and the impaired limb side holder 3 may be reversed to configure as the wheelchair for four-legged animal for four-legged animal with impaired front limbs.

Also, for four-legged animals with weakened limbs on all four sides, the wheelchair may be configured to allow the installation of the impaired limb side holder 3 on both the forelimb side and hindlimb side. In this case, the height of the pair of wheel arms 5 is independently adjustable on each impaired limb side holder 3 for the forelimb side and hindlimb side. Alternatively, the impaired limb side holder 3 may be configured to be attached to the entire body. For this single impaired limb side holder 3, a pair of wheel arms 5 may be provided on left and right side for both the forelimb side and hindlimb side. That is, the wheel arms 5 provided on the impaired limb side holder 3 may be a single pair on both side, or two pairs on both side, or more than one pair on both side.

Furthermore, the wheel hoisting and lowering mechanism 7 is not limited to the configurations described in the above embodiments but may have any configuration as long as it can raise and lower the height of the wheels 6 independently of each other. For example, in the first embodiment described above, the slider 75 was driven by the feed screw 71*a*, but it may also be driven by an unillustrated drive wire.

Specifically, the slider 75 may be fixed to the drive wire, and the slider 75 may be driven by pulling the drive wire in the forward and backward directions using the stepping motor 71*b*.

REFERENCE SIGNS LIST

1A, 1B, 1C Wheelchair for four-legged animal
2 Healthy limb side holder
21 Wearing portion
22 Neck frame
23 Back frame
3 Impaired limb side holder
31 Horizontal frame
32 Saddle frame
33 Waist frame
34 Vertical frame
4 Connecting member
5 Wheel arm
51 Impaired limb cover
6 Wheel
7 Wheel hoisting and lowering mechanism
71 Actuator
71*a* Feed screw
71*b* Stepping motor
72 Tilt sensor
73 Control unit
74 Command signal acquisition unit
75 Slider
76 Connecting frame
77 Actuator box
8 Fall recovery mechanism

81 Assist bar
82 Assist box
83 Drive motor
84 Wire
85 Winding shaft
86 Rotation shaft
9 Gearbox
91 Hoisting and lowering motor
92 Worm
93 Worm wheel
94 Rack
95 Vertical movement bar

The invention claimed is:

1. A wheelchair for a four-legged animal, comprising:

an impaired limb side holder that is attached to an impaired limb side body of the four-legged animal;

a pair or more of left and right wheel arms that are mounted to the impaired limb side holder at its left and right positions, which are separated in a lateral direction, and rotatably support left and right wheels;

a wheel hoisting and lowering mechanism that independently changes relative height of each of the wheels relative to the impaired limb side holder in order to reduce tilt of the attached impaired limb side holder when it tilts due to changes of conditions in a road surface or a body of the four-legged animal; and a tilt sensor that is configured to detect the tilt of the impaired limb side holder about a longitudinal axis of the four-legged animal;

a fall recovery mechanism having a left assist bar and a right assist bar that are respectively disposed on left and right sides of the impaired limb side holder, and that are configured to selectively extend from and retract to the fall recovery mechanism, wherein the left assist bar is configured to extend toward a road surface on the left side of the impaired limb side holder when the tilt sensor detects that the impaired limb side holder is tilted toward the left side by a predetermined angle indicating a left side-lying state, the right assist bar is configured to extend toward the road surface on the right side of the impaired limb side holder when the tilt sensor detects that the impaired limb side holder is tilted toward the right side by a predetermined angle indicating a right side-lying state, and extension of the right assist bar or the left assist bar thereby generates a reaction force from the road surface to return the four-legged animal to a standing state.

2. The wheelchair for four-legged animal according to claim 1, wherein the wheel hoisting and lowering mechanism comprises an actuator provided for each wheel arm, which drives the wheel arms according to a specified drive direction and drive amount; and a command signal acquisition unit which acquires a command signal, which contains the drive direction and the drive amount for each actuator, for reducing the tilt of the impaired limb side holder by moving each wheel arm up or down.

3. The wheelchair for four-legged animal according to claim 2, further comprising:

a tilt sensor for detecting the tilt of the impaired limb side holder; and a control unit that calculates the drive direction and the drive amount of each actuator based on a detection signal output from the tilt sensor, and outputs a command signal to the command signal acquisition unit.

4. The wheelchair for four-legged animal according to claim 3, wherein the control unit is configured to drive the actuator to move each wheel arm upward before the fall recovery mechanism extends the assist bar.

5. The wheelchair for four-legged animal according to claim 2, wherein the actuator is configured to move each wheel arm upward based on the command signal before the fall recovery mechanism extends the assist bar.

6. The wheelchair for a four-legged animal according to claim 1, wherein the wheel hoisting and lowering mechanism comprises a left actuator configured to move the left wheel in a vertical direction and a right actuator configured to move the right wheel in the vertical direction, when the tilt sensor detects either the left side-lying state or the right side-lying state, the left actuator and the right actuator are configured to move the left wheel and the right wheel upward before the corresponding one of the left assist bar and the right assist bar extends.

7. A wheelchair for a four-legged animal, comprising:

an impaired limb side holder that is attached to an impaired limb side body of the four-legged animal;

a pair or more of left and right wheel arms that are mounted to the impaired limb side holder at its left and right positions, which are separated in a lateral direction, and rotatably support left and right wheels;

a wheel hoisting and lowering mechanism that independently changes relative height of each of the wheels relative to the impaired limb side holder in order to reduce tilt of the attached impaired limb side holder when it tilts due to changes of conditions in a road surface or a body of the four-legged animal; and the wheel hoisting and lowering mechanism comprises a left actuator configured to move the left wheel in a vertical direction and a right actuator configured to move the right wheel in the vertical direction, wherein the left and right actuators respectively drive the left and right wheel arms according to a specified drive direction and drive amount, a command signal acquisition unit that acquires a command signal, which contains the drive direction and the drive amount for each of the left and right actuators, for reducing the tilt of the impaired limb side holder by moving each wheel arm up or down, a tilt sensor that is configured to detect the tilt of the impaired limb side holder about a longitudinal axis of the four-legged animal, a control unit that calculates the drive direction and the drive amount of each of the left and right actuators based on a detection signal output from the tilt sensor, and outputs a command signal to the command signal acquisition unit, wherein the left actuator is configured to move the left wheel downward and the right actuator is configured to move the right wheel upward when the tilt sensor detects that the impaired limb side holder is tilted toward the left side in correspondence with the command signal, and the left actuator is configured to move the left wheel upward and the right actuator is configured to move the right wheel downward when the tilt sensor detects that the impaired limb side holder is tilted toward the right side in correspondence with the command signal.

8. The wheelchair for the four-legged animal according to claim 7, wherein the impaired limb side holder is attached to rear limbs of the four-legged animal, the tilt sensor is further configured to detect the tilt of the impaired limb side holder about a lateral axis of the four-legged animal, the left actuator and the right actuator are configured to move the left wheel and the right wheel upward, respectively, when the tilt sensor detects that the impaired limb side holder is tilted toward a front side in correspondence with the command signal, the left actuator and the right actuator are configured to move the left wheel and the right wheel downward, respectively, when the tilt sensor detects that the impaired limb side holder is tilted toward a back side in correspondence with the command signal.

* * * * *